United States Patent [19]

Chappelie

[11] Patent Number: 5,342,880
[45] Date of Patent: Aug. 30, 1994

[54] PHENOLIC RESOL PLYWOOD RESIN, MANUFACTURE AND USE

[75] Inventor: Norman A. Chappelie, Springfield, Oreg.

[73] Assignee: Neste Resins Corporation, Eugene, Oreg.

[21] Appl. No.: 855,549

[22] Filed: Mar. 20, 1992

[51] Int. Cl.$^5$ .................................. C08K 3/26
[52] U.S. Cl. .................... 524/596; 524/594; 528/147; 528/488; 528/489
[58] Field of Search ............ 524/596, 594; 528/147, 528/488, 489

[56] References Cited

U.S. PATENT DOCUMENTS

| | | | |
|---|---|---|---|
| 3,342,776 | 9/1967 | Lambuth | 524/35 |
| 3,696,064 | 10/1972 | Re | 524/14 |
| 4,194,996 | 3/1980 | Babina et al. | 524/14 |
| 4,608,408 | 8/1986 | Hood et al. | 524/15 |
| 4,758,478 | 7/1988 | Daisy et al. | 428/529 |

Primary Examiner—Paul R. Michl
Assistant Examiner—John J. Guarriello
Attorney, Agent, or Firm—Raymond N. Baker

[57] ABSTRACT

An aqueous phenol-formaldehyde resin solution with formaldehyde-phenol mol ratio in the range of 1.8 to 2.8, polymerization catalyst of 3% to 9% by weight, measured as NaOH equivalent, with less than 1% by weight potassium hydroxide, and about 0.1% to about 0.75% by weight potassium carbonate added after the catalytically-activated polymerization reaction has subsided while the resin is both soluble and fusible ("A" resol stage). Adhesive binders exhibit tolerance for variables in veneer moisture content from 0% to around 25% and in production timing from delivery of the veneer for assembly to curing of around 10 minutes to about 2 hours without significant degradation of bonding quality.

4 Claims, No Drawings

PHENOLIC RESOL PLYWOOD RESIN, MANUFACTURE AND USE

This invention is concerned with aqueous phenol-formaldehyde resin solutions, their manufacture and use; and more particularly with new aqueous phenol-formaldehyde resin solutions enabling preparation of adhesive binders which make higher yield production of plywood more practicable.

Soft wood logs from which veneer is formed are conditioned in heated water vats in an attempt to avoid splitting and rough surfaces during peeling. The veneer is cooled and dried as rapidly as permitted by the facilities in order to save time and costs, and may be directed to panel production or storage. As a result, the veneer in the production line for plywood assembly and manufacture can have moisture content and other characteristics which vary substantially from what has been considered optimum for assembly and manufacture of "softwood" panels. ("Softwood" has been defined as comprising Southern Pine, Douglas Fir, Ponderosa pine, and the like, with the possibility of low percentages of hardwoods such as oak, alder, aspen, red gum, walnut and birch sometimes being included.)

An important contribution of the present invention is improving the tolerance of adhesive binders, prepared from the aqueous phenolic resin solutions taught herein, for varying veneer characteristics and other variables encountered in commercial production of plywood using phenol-formaldehyde (P-F) resin.

Plywood adhesive binders are prepared by combining the aqueous phenol-formaldehyde resin solution with fillers, thickeners, NaOH and water. The adhesive binder is spread on prepared veneer for laying up as a plywood panel. The assembled panel (which may be first pre-pressed) is placed in a hot press where it is consolidated and the resin is cured under heat and pressure.

Plywood manufacturers are interested in resins which produce binders enabling use of low spread rates and in higher production rates made available, for example, by faster curing times.

A recent approach to faster curing times advocates use of relatively high percentages of potassium hydroxide (from at least 1% to about 7% by weight of the resin solution) as a part of the alkali metal hydroxide used as a polymerization catalyst in manufacturing phenol-formaldehyde resol resin solutions.

The present invention departs from such prior practice by concentrating on compensating for variables encountered in plywood production practice in order to increase the opportunity for satisfactory production as well as increasing production rates and product yield.

One disadvantage in using relatively high levels of KOH to decrease curing times is the increase in cost of the alkali metal hydroxide raw materials. Also, as taught herein, a decrease in conversion efficiency of the phenol and formaldehyde is associated with use of potassium hydroxide (in place of sodium hydroxide as a catalyst) which requires increased use of both the phenol and the formaldehyde constituents in order to obtain a desired level of "resin solids"; thus, raw material costs are further increased. Also, shortened panel assembly times (in the 10 minute range) are recommended for a 50% potassium hydroxide modified resin; and, it has been pointed out that any improvement in curing time performance is lost with such a resin if panel production line times are lengthened to between 40 and 80 minutes.

However, there are numerous and sometimes uncontrollable factors which affect production timing in commercial practice; for example: log preparation, veneer peeling, veneer preparation, veneer drying, veneer handling, climatic conditions, spread times, ply assembly times, press loading times and required curing times (see "Plywood and Adhesive Technology" by Terry Sellers, Jr., ©1985, published by Marcel Dekker, Inc., 270 Madison Ave., NY, N.Y. 10016, pp. 46–53, 59, 62–76) The uniformity preferred for softwood plywood production (set forth at page 518 of the above text) is not readily achievable in commercial practice with production facilities currently available.

However, it has been discovered that an aqueous phenol-formaldehyde resin solution, which significantly improves tolerance of the adhesive binder for the production variables typically encountered can be manufactured by catalytically polymerizing the phenol and formaldehyde with about 3% to 9% by weight alkali metal hydroxide calculated as NaOH, but in which less than 1% by weight of the resin solution is potassium hydroxide; and, by making a distinctive additive (potassium carbonate) at one or more distinctive times to the resin solution.

The potassium carbonate is added as the catalytically-induced polymerization reaction has substantially subsided; that is, when the exothermic reaction thermal energy release has decreased (referred to as "in cooldown") or when the temperature of the resins solution is controlled and held in a temperature range between about 10° C. to about 30° C. in preparation for mixing and use in an adhesive binder.

In either event, the potassium carbonate is added to the solution when the resin is both soluble in the solution and fusible (referred to as the "A or resol stage" in "The Chemistry of Phenolic Resins", Robert A. Martin ©1956, pg 119, Published by John Wiley & Sons, Inc., New York).

The potassium carbonate ($K_2Co_3$) can be added as a comminuted solid or in an aqueous solution; the latter is preferred because of simplicity of handling.

Polymerizing the phenol and formaldehyde in the presence of less than 1% potassium hydroxide (preferably around 0.5% or less) by weight of the resin solution, along with minimal amounts of potassium carbonate, added as above described, increases the tolerance of the adhesive binder for a wide range of veneer characteristics and production variables in commercial practice. While resin gel times can be decreased by increasing the potassium carbonate, the range of the potassium carbonate taught herein is from about 0.1% to about 0.75% by weight of the resin solution. Potassium carbonate significantly above 0.75% by weight can decrease tolerance levels made available by the invention so that potassium carbonate levels approaching 1% by weight are not considered to be an acceptable trade-off for the decrease in resin gel time. As taught herein, the optimum amount of potassium carbonate is around 0.5% by weight.

A significant contribution of the present invention involves the workable relationship of the resin and the resin in solution maintained during the time the panels are being prepared on the production line and during curing. The invention compensates in a practical way for variables in the veneer as delivered for assembly, spreading of the adhesive binder, assembly of binder-spread panels and handling of the assembled panels before start of hot pressing and curing; for example, production line times until thermosetting cross linking of the resin of about 20 minutes to 2 hours can be tolerated without significantly degrading the bonding quality of the adhesive binder.

Whereas, in prior practice production line times exceeding about 25 minutes could cause a loss of resin and/or water into the wood which diminished the bonding quality where needed at the surface of the veneer. However, adhesive binders compounded with the resin solutions of the present invention exhibit significant resistance to such "dry-out" and/or related "assembly-time" delay phenomenon and provide a bonding quality such that delamination is avoided when pressure is released in the hot press.

Phenolic resol solutions of this invention have been used in the manufacture, under commercial production-processing conditions, of test plywood samples made with veneers containing moisture substantially greater than the 3%-5% normally recommended, glue spreads 10 to 15% below that normally recommended and with normally recommended press cycles (curing times) decreased by 15 to 25%.

TEST COMPARISON I

A commercial phenol-formaldehyde resol resin, CHEMBOND ® Control Sample, was prepared in the laboratory following the formula set forth below; substantially the same formulation but incorporating 0.95% KOH as part of the alkali polymerization catalyst and with 0.5% $K_2CO_3$ by weight, added as previously described, were used in the Hi-Tolerance Resol.

TABLE IA

| | | FORMULAS | |
|---|---|---|---|
| Item Resol | Concentration | CHEMBOND ® Control Sample | CHEMBOND ® Hi-Tolerance |
| Phenol | 100% | 24.85% | 25.18% |
| HCHO | 50% | 35.68 | 36.16 |
| NaOH | 50% | 13.70 | 11.45 |
| KOH | 45% | — | 2.11 |
| | | 100.00% | 100.00% |
| K2CO3 | 100% | — | 0.50 |

Note that decreased conversion efficiency of phenol and formaldehyde in using even a slight percentage of KOH (less than 1%) as part of the polymerization catalyst is adjusted by the slight increases in phenol and formaldehyde percentages shown in the Hi-Tolerance Resol.

It should also be noted that about ¼% to about 2% by weight urea can be added without detriment to the desired properties during the phenolic resol resin "cool down" to act as a scavenger for free formaldehyde and for control of resin flow properties.

TABLE IB

| | RESULTS | |
|---|---|---|
| Resol | CHEMBOND ® Control Sample | CHEMBOND ® Hi-Tolerance |
| % "Resin Solids" | 43.3 | 43.5 |
| % "NaOH" | 6.73 | 6.61 |
| Visc. G-H | TTU | TTU |
| Gel Time @100 C | 30.0 min. | 20.25 min |

The above two resin solutions were compounded into plywood adhesives using the following formula which has as an objective 27.1% resin solids.

TABLE IC

| Formula | Percent |
|---|---|
| Resin | 63.04 |
| Water | 20.57 |
| Wheat Flour | 6.64 |
| Modal | 6.64 |
| 50% NaOH | 2.65 |
| Soda Ash | 0.46 |
| | 100.00 |

The resulting Control Sample and Hi-Tolerance adhesive binders were then used to glue 12"×12" test panels using ⅛" Southern Pine veneer with at least 10% moisture content (MC) for the first set of tests. The normal moisture content for gluing is generally 0 to 1% for centers and cores, and about 5%, or up to 7% maximum, for faces and backs. Bonding with a minimum of 10% moisture content at 305° F. (about 152° C.) made it possible to obtain an indication of the minimum cure time and ability of the resin to handle high moisture.

The adhesive spread rate was 60 pounds per 1000 sq. feet of double glue line (mdgl). The normal spread rate expected for such softwood is 80 to 100+#/mdgl. Thus, the low spread rate capabilities of the resin could be tested.

Six panels were bonded for each resin and the averages are set forth below:

TABLE IC

| | RESULTS | |
|---|---|---|
| | CHEMBOND ® Control Sample | CHEMBOND ® Hi-Tolerance Resol |
| Minimum Cure Time (at 305° F.) | 5.75 min. | 5.50 min. |
| Dry Shear | 243 psi | 300 psi |
| Boil Shear | 169 psi | 175 psi |

TEST COMPARISON II

The same adhesive binders of Table IC above were spread at 50#/mdgl on southern pine ⅛" veneer with less than about 3% moisture content. These panels were then pressed at 305° F. for six (6) minutes to test the resistance to "dry out" and "assembly time" problems. The very low adhesive binder spread rate combined with the low moisture content veneer was relied on to accentuate what would be a normal tendency for water to migrate from the bonding zone into the dry wood; and, thus, cause the resin to lose "flowability" because it no longer had the carrier which enables the resin to move into wood to be in a position to cross link with resin at the bonding surface. Such a loss of flowability is termed "dry-out" in plywood adhesive and technology terminology.

"Assembly-time" tolerance was also evaluated in the same test as a similar type phenomenon in which loss of resin and moisture to the low moisture wood can occur. Two panels were bonded for each resin and the averages are reported below:

TABLE II

| Resol | RESULTS | |
|---|---|---|
| | CHEMBOND ® Control Sample | CHEMBOND ® Hi-Tolerance |
| Dry Shear | 134 psi | 140 psi |
| Vac/Press Shear | 48 psi | 72 psi |

The "dry-out" and "assembly-time" tendencies expected of dry veneer, and problems associated with confronting a variety of veneer characteristics in assembling plywood are overcome by the present teachings. Use of a low percentage of potassium hydroxide as a polymerization catalyst and a low percentage of potassium carbonate, added as described, act to sustain a desired relationship between the resin and resin in solution under varying conditions. Such relationship extends into the curing phase enabling desired penetration of the wood during the "A resol stage" and uniform escape of steam during heat-up and extending into the "final C or resite stage," when thermosetting cross linking of the resin occurs, thus avoiding delamination due to internally trapped steam.

Subsequent samples similar to those which produced the results of Table IC were tested with moisture content of center or core veneer at about 10% to 15% and with face and back veneer moisture content around 25%; such testing using the Hi-Tolerance resol resin showed no significant degradation in bonding notwithstanding the high moisture levels of the veneer.

In practice of the invention the resin solution contains about 40 to 50% resin solids (determined by Wood Adhesive Manufacturing Technical Association 2.2); the mol ratio of the formaldehyde to phenol is in the range of about 1.8 to 2.8, the potassium hydroxide of the alkali metal hydroxide polymerization catalyst is limited to less than 1% by weight and the potassium carbonate added when in the "A or resol stage" is in the range about 0.1% to about 0.75% by weight.

The resin solution is combined with thickeners, fillers, caustic soda, and water (soda ash and/or borax can also be included) to form an adhesive binder which contains about 20% to about 35% "resin solids."

The objective in mixing the resin solution with the thickeners, fillers, caustic and water is to arrive at an adhesive binder in which viscosity is between about 3000 and about 7000 centipoises. That is, the binder is formed with a texture permitting it to be spread as a curtain, by spraying or by a roller coating to form a layer (which is essentially a gap filler) forming a smooth bonding layer between plies.

The fillers and thickeners make the adhesive binder more economic; and, more flexible in the bonding zone. The use of sodium hydroxide (NaOH) in forming the adhesive binder helps to break down the fillers to make a more uniform mixture. Resin solution and water are used to decrease viscosity, as mixing-in of the thickeners and fillers proceeds, so as to achieve the desired consistency for the type of spreading to be employed.

While specific data on phenolic resol resins and adhesive binders have been set forth in describing the invention, it should be recognized that the above teachings could be used to devise embodiments other than those specifically described; therefore, in determining the scope of the present invention, reference shall be had to the appended claims.

I claim:

1. A process for the manufacture of an aqueous phenol-formaldehyde resin solution for use in preparing an adhesive binder comprising the steps of:
   preparing an aqueous solution of phenol and formaldehyde,
   adding a polymerization catalyst comprising alkali metal hydroxide, at least a portion of such alkali metal hydroxide consisting of potassium hydroxide,
   providing for cool-down of the resin solution when the level of exothermic energy releases due to the catalytically induced polymerization reaction have subsided to the point where the resin has polymerized to a soluble and fusible phase in the aqueous solution; then
   controlling the temperature of the resin solution to be in the range of about 10° C. to about 30° C.;
   adding to the resin solution by selection from the group consisting of:
   (i) adding potassium carbonate during the cool-down of the resin solution;
   (ii) adding potassium carbonate to the temperature-controlled resin solution prior to use of the resin solution for preparation of the adhesive binder; and
   (iii) combinations thereof;
   such manufacture of the resin solution being carried out with the addition of potassium hydroxide to the resin solution as a polymerization catalyst being limited to consist of less than 1% by weight of the resin solution,
   the addition of potassium carbonate to the resin solution being in the range of about 0.1% to about 0.75% by weight of the resin solution; and
   the potassium carbonate as added is selected from the group consisting of:
   (a) a liquid solution of potassium carbonate,
   (b) potassium carbonate as a comminuted solid, and
   (c) combinations thereof.

2. A process for the manufacture of an aqueous phenol-formaldehyde resin solution comprising the steps of:
   mixing a solution of phenol-formaldehyde, water and a polymerization catalyst and thereby causing a polymerization reaction,
   the polymerization catalyst including potassium hydroxide in an amount less than 1% of the weight of the resin solution,
   continuing the polymerization reaction until the resin is both soluble in the solution and fusible, and
   thereafter adding potassium carbonate in an amount from about 0.1% to about 0.75% by weight of the resin solution.

3. The process of claim 2 wherein the amount of potassium hydroxide polymerization catalyst is about 0.5% by weight of the resin solution.

4. The process of claim 2 wherein the amount of potassium carbonate comprises about 0.5% of the weight of the resin solution.

* * * * *